United States Patent
Ibamoto et al.

(10) Patent No.: US 7,331,897 B2
(45) Date of Patent: Feb. 19, 2008

(54) ACTIVE SHIFT TRANSMISSION, TRANSMISSION CONTROL UNIT AND AUTOMOBILE

(75) Inventors: Masahiko Ibamoto, Hitachinaka (JP); Hiroyuki Sakamoto, Hitachinaka (JP); Hiroshi Kuroiwa, Hitachi (JP)

(73) Assignees: Hitachi, Ltd., Tokyo (JP); Hitachi Car Engineering Co., Ltd., Hitachinaka-shi (JP)

(*) Notice: Subject to any disclaimer, the term of this patent is extended or adjusted under 35 U.S.C. 154(b) by 0 days.

(21) Appl. No.: 11/757,435

(22) Filed: Jun. 4, 2007

(65) Prior Publication Data

US 2007/0232434 A1 Oct. 4, 2007

Related U.S. Application Data

(63) Continuation of application No. 10/920,248, filed on Aug. 18, 2004, now Pat. No. 7,226,379.

(30) Foreign Application Priority Data

Sep. 4, 2003 (JP) .............................. 2003-312078

(51) Int. Cl.
*F16H 48/06* (2006.01)
(52) U.S. Cl. ............................ 475/221; 477/5; 74/329; 74/330; 74/331; 74/333; 74/336 R; 74/339; 74/664; 74/661; 180/65.2; 180/65.7
(58) Field of Classification Search .................... None
See application file for complete search history.

(56) References Cited

U.S. PATENT DOCUMENTS 6,666,787 B2  12/2003  Doepke ........................ 475/5
6,712,734 B1  3/2004  Loeffler ........................ 477/5
6,945,893 B2  9/2005  Grillo et al. .................... 475/5
2002/0189397 A1  12/2002  Sakamoto et al. ............ 74/661
2004/0116243 A1  6/2004  Ibamoto et al. ................ 477/3
2005/0120817 A1  6/2005  Sakamoto et al. ............ 74/335

FOREIGN PATENT DOCUMENTS

| EP | 0545618 A2 | 9/1997 |
| JP | 2002-204504 | 7/2002 |
| JP | 2003-072403 | 3/2003 |
| JP | 2003-113934 | 4/2003 |
| WO | WO 00/26559 | 11/2000 |

*Primary Examiner*—David D. Le
(74) *Attorney, Agent, or Firm*—Crowell & Moring LLP

(57) ABSTRACT

The object of the invention is to provide a less expensive active transmission control system for an automobile, capable of disconnecting an engine, without increasing the number of dog clutches.

In an active shift transmission, a second intermediate shaft is provided between a transmission input shaft connected with an engine and a transmission output shaft, and the transmission ratio is determined by the product of gear ratios of two sets of transmission gears. Further, a differential gear box is connected between both intermediate shafts and a motor is connected to the third shat of this differential gear box, so that the engine torque is borne by the motor on a temporary basis, whereby active transmission is performed. When the transmission gear of the input shaft is released, the engine rotation loss at the time of regenerative braking can be eliminated by disconnecting the engine.

6 Claims, 20 Drawing Sheets

EQUIVALENT CONSTRUCTION DRAWING

EQUIVALENT CONSTRUCTION DRAWING

FIG. 3A 0.5th GEAR 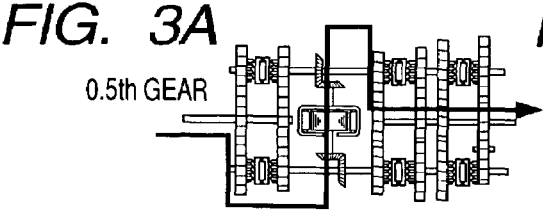
FIG. 3G 3.5th GEAR 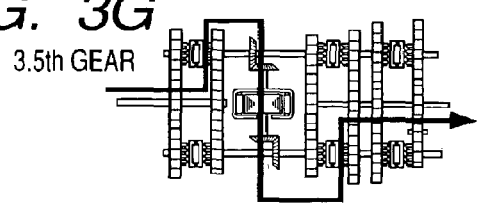
FIG. 3B 1st GEAR 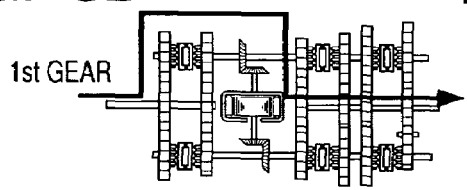
FIG. 3H 4th GEAR 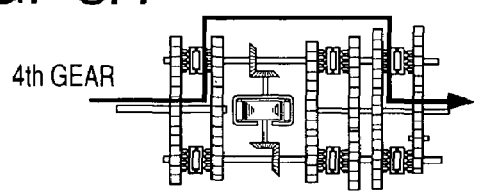
FIG. 3C 1.5th GEAR 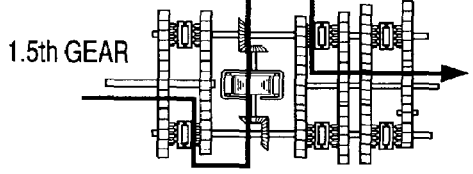
FIG. 3I 4.5th GEAR 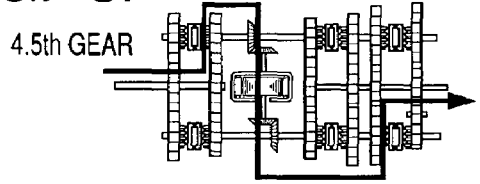
FIG. 3D 2nd GEAR 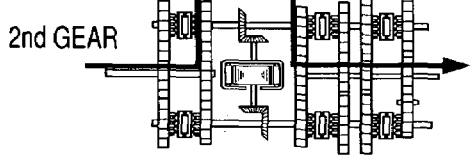
FIG. 3J 5th GEAR 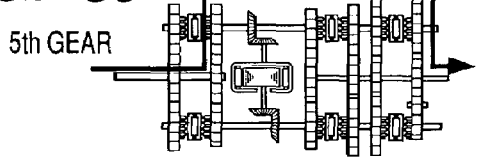
FIG. 3E 2.5th GEAR 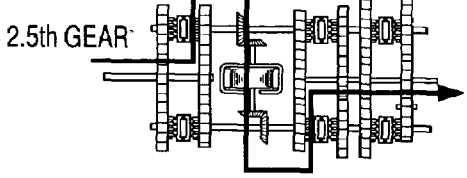
FIG. 3K -0.5th GEAR 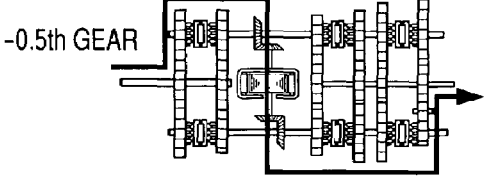
FIG. 3F 3rd GEAR 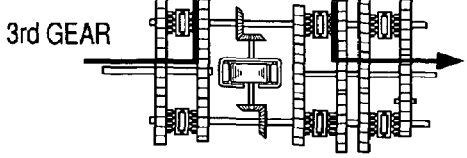
FIG. 3L -1st GEAR 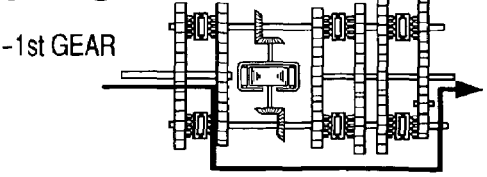

| GEAR SET | GEAR RATIO | GEAR SHIFT STEP | GEAR SET COMBINATION | TRANSMISSION RATIO |
|---|---|---|---|---|
| G11 | 2.500 | 0.5th GEAR | G41×G21 | 3.360 |
| G12 | 1.700 | 1st GEAR | G11×G21 | 2.887 |
| G21 | 1.155 | 1.5th GEAR | G42×G21 | 2.328 |
| G22 | 0.756 | 2nd GEAR | G12×G21 | 1.963 |
| G23 | 0.574 | 2.5th GEAR | G12×G31 | 1.586 |
| G24 | 0.445 | 3rd GEAR | G12×G22 | 1.285 |
| G31 | 0.933 | 3.5th GEAR | G12×G32 | 1.076 |
| G32 | 0.633 | 4th GEAR | G12×G23 | 0.976 |
| G33 | 0.489 | 4.5th GEAR | G12×G33 | 0.832 |
| G41 | 2.910 | 5th GEAR | G12×G24 | 0.756 |
| G42 | 2.016 | -0.5th GEAR | G11×GR | 3.215 |
| GR | 1.286 | -1st GEAR | G42×GR | 2.592 |

FIG. 5

| GEAR RADIUS | | GEAR RATIO | |
|---|---|---|---|
| r1 | 50.716 | G11 | 2.500 |
| r2 | 20.284 | | |
| r3 | 59.026 | G41 | 2.910 |
| r4 | 44.700 | G12 | 1.700 |
| r5 | 26.300 | | |
| r6 | 53.010 | G42 | 2.016 |
| r7 | 40.840 | G21 | 1.155 |
| r8 | 47.160 | | |
| r9 | 50.540 | G31 | 0.933 |
| r10 | 50.120 | G22 | 0.756 |
| r11 | 37.880 | | |
| r12 | 59.820 | G32 | 0.633 |
| r13 | 55.900 | G23 | 0.574 |
| r14 | 32.100 | | |
| r15 | 65.600 | G33 | 0.489 |
| r16 | 60.900 | G24 | 0.445 |
| r17 | 27.100 | | |
| r18 | 21.073 | GR | 1.286 |

| | |
|---|---|
| CENTER DISTANCE L1 | 71.000 |
| CENTER DISTANCE L4 | 79.310 |
| CENTER DISTANCE L2 | 88.000 |
| CENTER DISTANCE L3 | 97.700 |

FIG. 6

| GEAR SHIFT STEP | GEAR SET COMBINATION | TRANSMISSION RATIO |
|---|---|---|
| 2.6th GEAR | G42×G22 | 1.523 |
| 3.3th GEAR | G42×G23 | 1.157 |
| 4.2th GEAR | G42×G24 | 0.897 |
| 2.2th GEAR | G42×G31 | 1.881 |
| 3.1th GEAR | G42×G32 | 1.276 |
| 3.7th GEAR | G42×G33 | 0.986 |
| 1.7th GEAR | G41×G22 | 2.199 |
| 2.4th GEAR | G41×G23 | 1.671 |
| 2.9th GEAR | G41×G24 | 1.295 |
| 1.2th GEAR | G41×G31 | 2.715 |
| 2.3th GEAR | G41×G32 | 1.843 |
| 2.8th GEAR | G41×G33 | 1.424 |
| 1.4th GEAR | G11×G31 | 2.333 |
| 2.5th GEAR | G11×G32 | 1.583 |
| 3.2th GEAR | G11×G33 | 1.223 |
| 2.1th GEAR | G11×G22 | 1.890 |
| 2.7th GEAR | G11×G23 | 1.436 |
| 3.4th GEAR | G11×G24 | 1.113 |
| -1.5th GEAR | G12×GR | 2.186 |
| -0.3th GEAR | G41×GR | 3.742 |

FIG. 7

| | G11 | G12 | G21 | G22 | G23 | G24 | G31 | G32 | G33 | G41 | G42 |
|---|---|---|---|---|---|---|---|---|---|---|---|
| GR  | 3.215 | 2.186 |  |  |  |  |  |  |  |  | 2.592 |
| G42 | – | – |  |  |  |  |  |  |  | 3.742 | × |
| G41 | – | – |  |  |  |  |  |  | × | 0.986 | 1.424 |
| G33 | 1.223 | 0.832 |  |  |  |  |  | × | 1.276 | 1.843 | × |
| G32 | 1.583 | 1.076 |  |  |  |  | × | 1.881 | 2.715 | × | × |
| G31 | 2.332 | 1.586 |  |  |  |  | 1.731 | 0.897 | 1.295 | -0.044 | -0.188 | -0.488 |
| G24 | 1.113 | 0.756 | 2.441 | 2.042 | 1.860 | 1.731 |  |  |  |  |  |
| G23 | 1.436 | 0.976 | 2.328 | 1.523 | 1.157 | 0.897 | × |  |  |  |  |
| G22 | 1.890 | 1.285 | 3.360 | 2.199 | 1.871 | 1.295 | × | × |  |  |  |
| G21 | 2.887 | 1.963 | 0.665 | 0.266 | 0.085 | -0.044 | × | × | × |  |  |
| G12 | × |  | 0.522 | 0.123 | -0.059 | -0.188 |  |  |  |  |  |
| G11 |  |  | 0.222 | -0.177 | -0.359 | -0.488 |  |  |  |  |  |

FIG. 8A
2-STEP JUMP-OVER
GEAR SHIFT (5-3 SHIFT)
FIG. 8B
2-STEP JUMP-OVER
GEAR SHIFT (4-2 SHIFT)
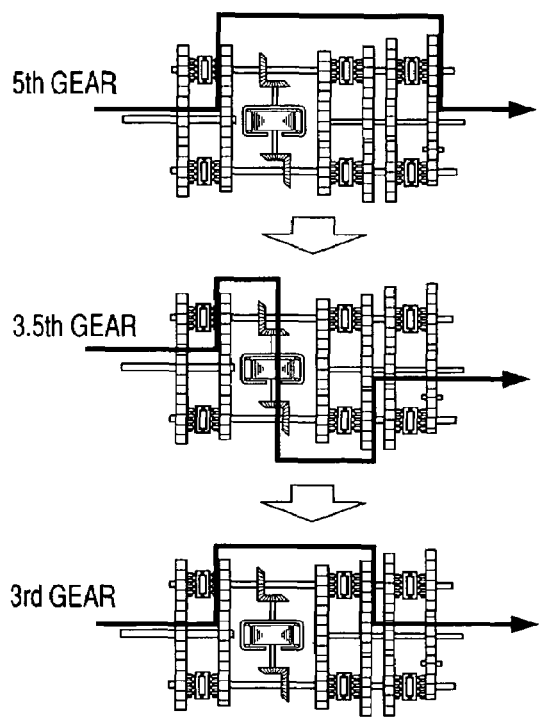
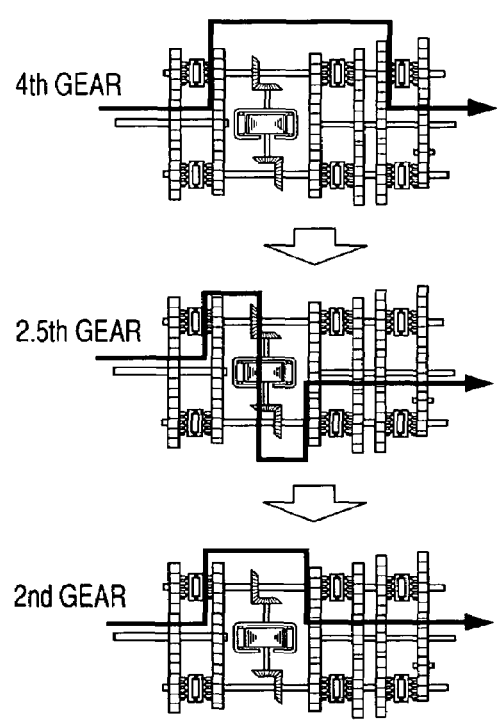
FIG. 8C
2-STEP JUMP-OVER GEAR SHIFT (3-1 SHIFT)
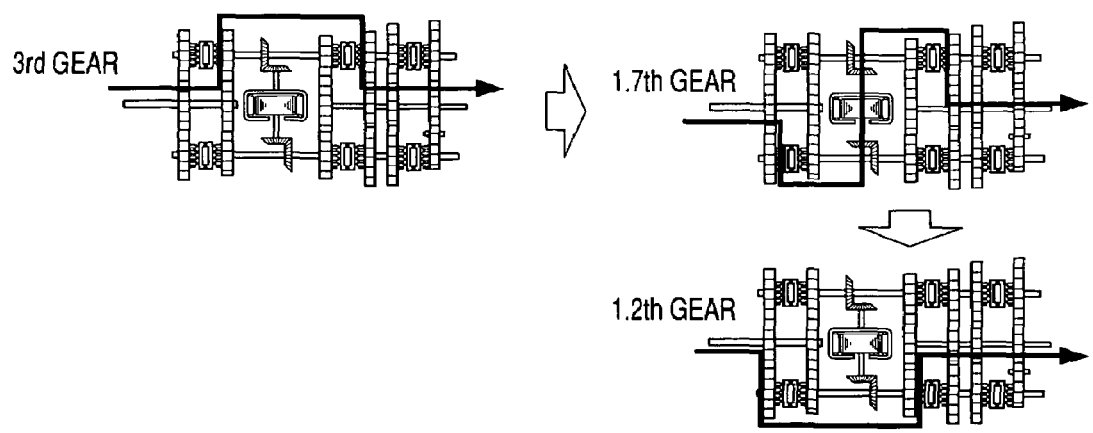

3-STEP JUMP-OVER
GEAR SHIFT (5-2 SHIFT)

5th GEAR 2.5th GEAR

2nd GEAR

3-STEP JUMP-OVER
GEAR SHIFT (4-1 SHIFT)

4th GEAR 2.4th GEAR 1.2th GEAR

EQUIVALENT CONSTRUCTION DRAWING

FIG. 16A 0.5th GEAR 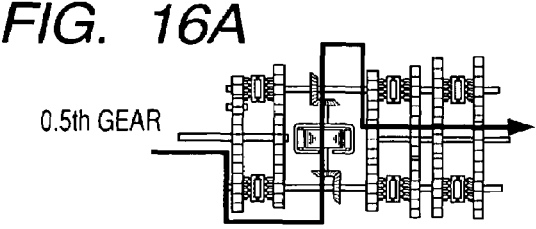
FIG. 16G 3.5th GEAR 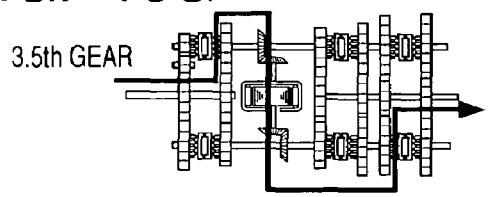
FIG. 16B 1st GEAR 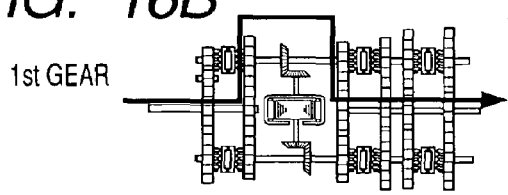
FIG. 16H 4th GEAR 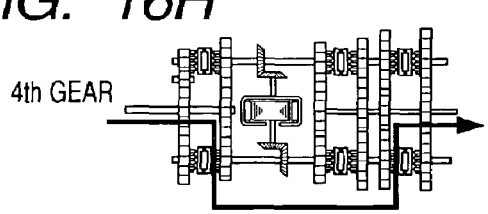
FIG. 16C 1.5th GEAR 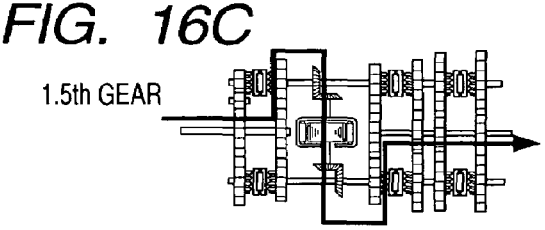
FIG. 16I 4.5th GEAR 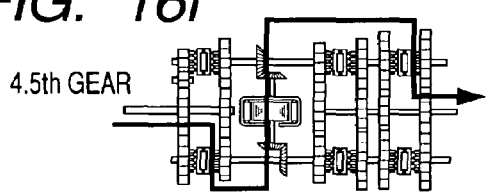
FIG. 16D 2nd GEAR 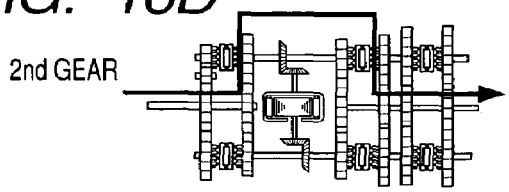
FIG. 16J 5th GEAR 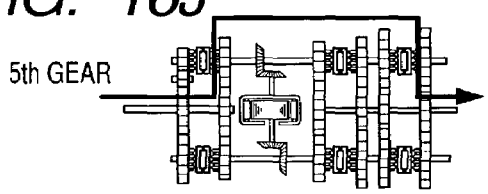
FIG. 16E 2.5th GEAR 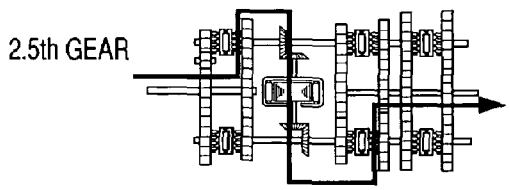
FIG. 16K 5.5th GEAR 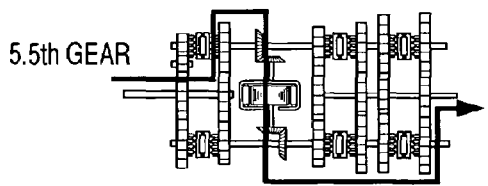
FIG. 16F 3rd GEAR 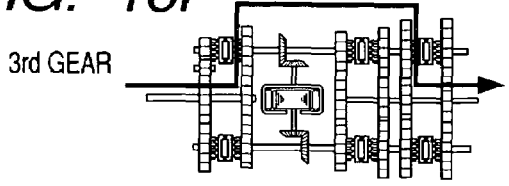
FIG. 16L 6th GEAR 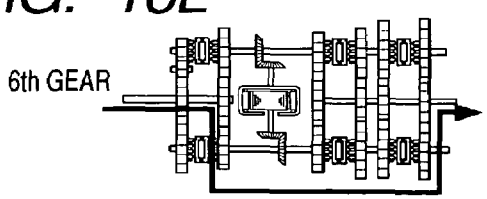

| GEAR SET | GEAR RATIO | GEAR SHIFT STEP | GEAR SET COMBINATION | TRANSMISSION RATIO | TARGET VALUE |
|---|---|---|---|---|---|
| G11 | -1.817 | 0.5th GEAR | G41×G21 | 3.223 | 3.333 |
| G12 | 1.682 | 1st GEAR | G12×G21 | 2.781 | 2.782 |
| G21 | 1.654 | 1.5th GEAR | G12×G31 | 2.368 | 2.369 |
| G22 | 1.163 | 2nd GEAR | G12×G22 | 1.957 | 1.955 |
| G23 | 0.707 | 2.5th GEAR | G12×G32 | 1.713 | 1.554 |
| G24 | 0.414 | 3rd GEAR | G12×G23 | 1.190 | 1.286 |
| G31 | 1.408 | 3.5th GEAR | G12×G33 | 1.070 | 0.975 |
| G32 | 1.018 | 4th GEAR | G42×G33 | 1.070 | 0.975 |
| G33 | 0.636 | 4.5th GEAR | G42×G24 | 0.697 | 0.756 |
| G34 | 0.379 | 5th GEAR | G12×G24 | 0.697 | 0.756 |
| G41 | 1.949 | 5.5th GEAR | G12×G34 | 0.637 | 0.600 |
| G42 | 1.682 | 6th GEAR | G42×G34 | 0.637 | 0.600 |
|  |  | -0.5th GEAR | G11×G31 | -2.558 | -3.246 |
|  |  | -1st GEAR | G11×G22 | -2.113 |  |

FIG. 18

| GEAR RADIUS | | GEAR RATIO | | TARGET VALUE |
|---|---|---|---|---|
| r1 | 41.280 | G11 | -1.817 | -2.350 |
| r2 | 22.720 | | | |
| r3 | 44.280 | G41 | 1.949 | 1.949 |
| r4 | 42.020 | G12 | 1.682 | 1.682 |
| r5 | 24.980 | | | |
| r6 | 42.020 | G42 | 1.682 | 1.682 |
| r7 | 26.380 | G21 | 1.654 | 1.654 |
| r8 | 43.620 | | | |
| r9 | 30.980 | G31 | 1.408 | 1.408 |
| r10 | 32.360 | G22 | 1.163 | 1.163 |
| r11 | 37.640 | | | |
| r12 | 36.960 | G32 | 1.018 | 0.924 |
| r13 | 41.000 | G23 | 0.707 | 0.765 |
| r14 | 29.000 | | | |
| r15 | 45.600 | G33 | 0.636 | 0.580 |
| r16 | 49.500 | G24 | 0.414 | 0.450 |
| r17 | 20.500 | | | |
| r18 | 54.100 | G34 | 0.379 | 0.400 |
| | | | | |

| CENTER DISTANCE L1 | 67.000 |
|---|---|
| CENTER DISTANCE L4 | 67.000 |
| CENTER DISTANCE L2 | 70.000 |
| CENTER DISTANCE L3 | 74.600 |

FIG. 19

| GEAR SHIFT STEP | GEAR SET COMBINATION | TRANSMISSION RATIO |
|---|---|---|
| 1st GEAR | G42×G21 | 2.781 |
| 2nd GEAR | G42×G22 | 1.957 |
| 3rd GEAR | G42×G23 | 1.190 |
| 1.5th GEAR | G42×G31 | 2.368 |
| 2.5th GEAR | G42×G32 | 1.713 |
| 1.6th GEAR | G41×G22 | 2.267 |
| 2.7th GEAR | G41×G23 | 1.379 |
| 4.2th GEAR | G41×G24 | 0.807 |
| 1.1th GEAR | G41×G31 | 2.744 |
| 1.9th GEAR | G41×G32 | 1.985 |
| 2.8th GEAR | G41×G33 | 1.239 |
| 4.3th GEAR | G41×G34 | 0.739 |
| -1.5th GEAR | G11×G32 | -1.850 |
| -3rd GEAR | G11×G33 | -1.155 |
| -5.2th GEAR | G11×G34 | -0.688 |
| -0.4th GEAR | G11×G21 | -3.004 |
| -2.8th GEAR | G11×G23 | -1.285 |
| -5th GEAR | G11×G24 | -0.752 |

FIG. 20

| | G11 | G12 | G21 | G22 | G23 | G24 | G31 | G32 | G33 | G34 | G41 | G42 |
|---|---|---|---|---|---|---|---|---|---|---|---|---|
| G42 | - | - | 2.781 | 1.957 | 1.190 | 0.697 | 2.368 | 1.713 | 1.070 | 0.637 | x | |
| G41 | - | - | 3.223 | 2.267 | 1.379 | 0.807 | 2.744 | 1.985 | 1.239 | 0.739 | | |
| G34 | -0.688 | 0.637 | 1.275 | 0.784 | 0.328 | 0.035 | x | x | x | | | |
| G33 | -1.155 | 1.070 | 1.018 | 0.527 | 0.071 | -0.222 | x | x | | | | |
| G32 | -1.850 | 1.713 | 0.635 | 0.145 | -0.311 | -0.604 | x | | | | | |
| G31 | -2.558 | 2.368 | 0.246 | -0.245 | -0.701 | -0.994 | | | | | | |
| G24 | -0.752 | 0.697 | x | x | x | | | | | | | |
| G23 | -1.285 | 1.190 | x | x | | | | | | | | |
| G22 | -2.113 | 1.957 | x | | | | | | | | | |
| G21 | -3.004 | 2.781 | | | | | | | | | | |
| G12 | x | | | | | | | | | | | |
| G11 | | | | | | | | | | | | |

US 7,331,897 B2

ACTIVE SHIFT TRANSMISSION, TRANSMISSION CONTROL UNIT AND AUTOMOBILE

RELATED APPLICATIONS

The present application is a continuation of U.S. application Ser. No. 10/920,248, filed Aug. 18, 2004, issued as U.S. Pat. No. 7,226,379, which claims priority to Japanese application serial no. 2003-312078, filed on Sep. 4, 2003, the content of which is hereby incorporated by reference into this application.

FIELD OF THE INVENTION

The present invention relates to the control of a transmission, in particular, to the art of reducing a transmission shock by cooperating control of an engine, motor and transmission.

BACKGROUND OF THE INVENTION

In the prior art automobile transmission, a planetary gear or counter shaft type transmission mechanism has been utilized. It is a common practice to change the speed by engaging the separately installed clutch with the gear steps having different transmission ratios on a selective basis. This is a method for shifting the engine torque from the front position gear to the next position gear by changing the engagement of the friction clutch. Since friction loss occurs at the time of gear shift and the clutch is a passive device, torque transfer cannot be achieved in principle at the time of downshifting. This has been a problem in the prior art.

To solve this problem, the applicants of the present invention filed an application for an active transmission method for regenerating the energy discharged at the time of up-shifting, using a motor as an active device, and for pumping up the torque from the high-shift position of lower power to the low-shift position of higher power at the time of down-shifting as indicated by Japanese Patent Laid-Open No. 2002-204504.

Although the aforementioned active transmission system is capable of solving the problems of the transmission using a prior art clutch, it requires a large-capacity motor for gear shift. The required motor capacity is calculated by (transmission torque by motor speed). The maximum transmission torque is equal to the maximum engine torque. In a common transmission, the maximum motor speed is equal to the difference speed at the time of 1-2 shift; therefore, the motor capacity of 20 kW or more is required, for example, when a 1.5 L engine is used.

To permit gear shift with the smallest possible motor, the present applicant filed an application for a method for ensuring a 50-percent reduction of motor capacity by using an intermediate gear as indicated by Japanese Patent Laid-Open No. 2003-113934. Since this method does not require use of a clutch in the input shaft, it reduces both weight and cost.

SUMMARY OF THE INVENTION

In the aforementioned intermediate position method, the input shaft does not use a clutch, and therefore the engine is always connected to the transmission. This method involves a problem in that, when a regenerative braking function as a hybrid function is used, the engine brake is applied at all times. It goes without saying that this problem can be solved by arranging a clutch, but this does not bring about a reduction in the weight and cost.

The object of the present invention is to solve the aforementioned problem and to provide a less costly active transmission control system for automobile use, while making an extensive use of the hybrid function.

The present invention provides a gear train configuration that disconnects an engine from the transmission without using a clutch. To put it more specifically, part of the gears is shifted to the side of the engine shaft side through modification of the layout of a gear with dog clutch, whereby engine disconnection is enabled, without allowing the number of the dog clutches to exceed that of the intermediate position type active shaft transmission system.

The present invention allows the engine to be disconnected from the transmission without increasing the number of the dog clutch, thereby increasing increase the efficiency in regenerative braking and ensuring economical disadvantages.

BRIEF DESCRIPTION OF THE DRAWINGS

FIG. 3 is an explanatory diagram of gear combinations representing a change in the torque transfer path when sequential transmission is performed with power turned on, in the transmission shown in FIG. 2;

FIG. 5 is a list showing examples of the gear radius, gear ratio obtained and center distance in the transmission shown in FIG. 2;

FIG. 6 is a list showing the secondary gear combinations and transmission ratios except for the sequential transmission in FIG. 4 in the transmission shown in FIG. 2;

FIG. 7 is a list showing all combinations and transmission ratios in the transmission shown in FIG. 2;

FIG. 8 is an explanatory diagram representing changes of the torque transfer path when 2-step jump-over gear shift is performed in the transmission shown in FIG. 2;

FIG. 16 is an explanatory drawing of gear combinations representing changes in the torque transfer path in the case of sequential transmission in the power-on mode, in the transmission of FIG. 15;

FIG. 18 is a list showing an example of the gear radius and obtained gear ratio, and center distance, in the transmission of FIG. 15;

FIG. 19 is a list showing the secondary gear combinations and transmission ratios, except for the sequential transmission of FIG. 17, in the transmission of FIG. 15; and FIG. 20 is a list showing all the gear combinations and transmission ratios in the transmission of FIG. 15.

DESCRIPTION OF THE PREFERRED EMBODIMENTS

Figure 1:
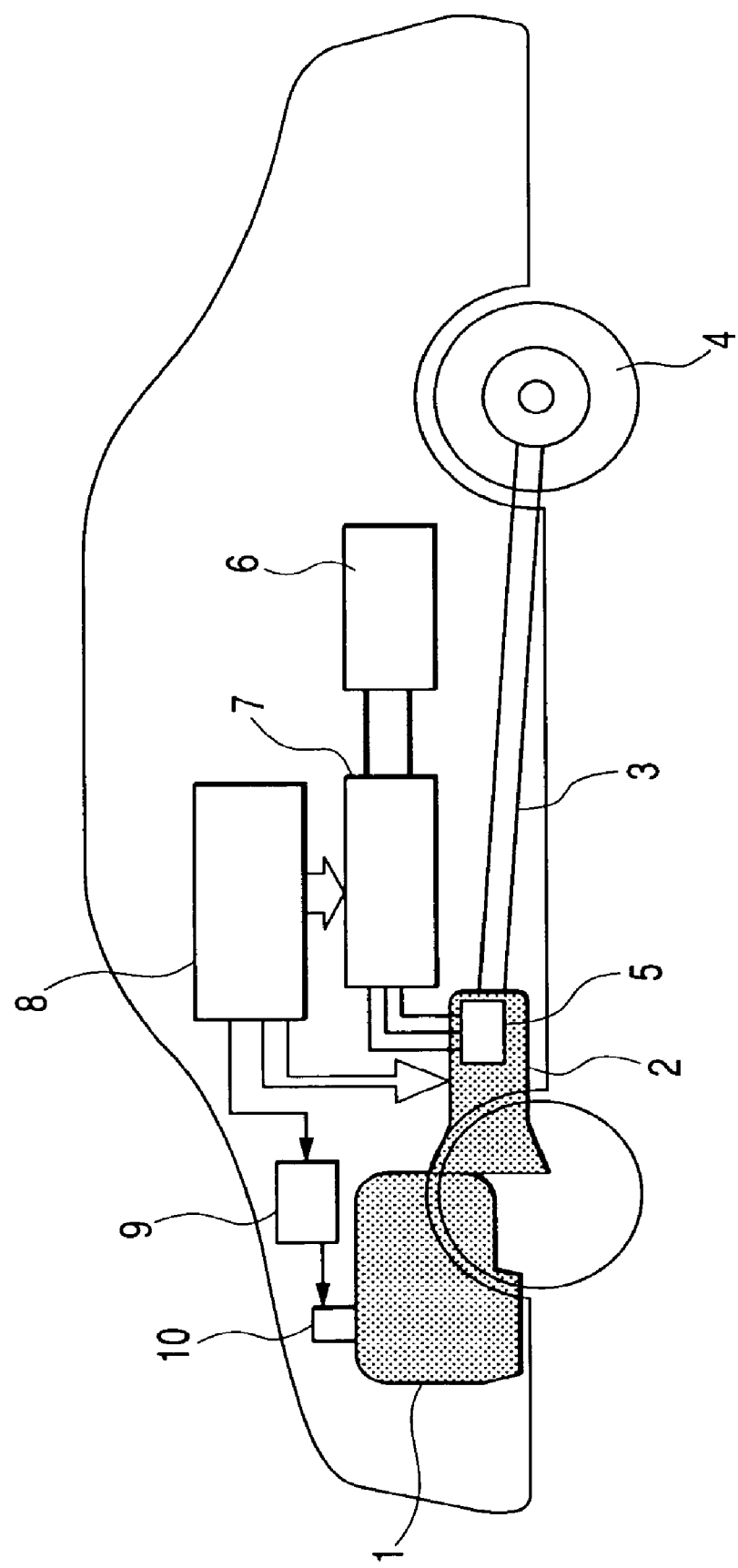
FIG. 1 is a conceptual diagram of an automobile with transmission mounted thereon, as an embodiment of the present invention.

FIG. 1 is a block diagram representing an embodiment of the present invention. An engine 1 as a prime mover of an automobile is connected with a transmission 2. An output shaft 3 drives a tire 4 through the differential gear. An electric motor 5 is built in the transmission 2. This motor 5 is connected with a control unit 7, and a battery 6 is mounted as a power supply of the control unit 7.

The engine 1 is provided with an electrically controlled throttle valve 10, which controls the engine output in response to a request signal.

A transmission control unit 8 controls the torque and revolutionary speed of the motor 5 through the motor control unit 7. It also controls the output of the engine 1 through the engine control unit 9 and electrically controlled throttle valve 10. Further, it provides operation instructions to the shift actuators 25 through 28 to be described later.

Here the engine control unit, transmission control unit and motor control unit are shown as separate control units. It is also possible to make such arrangements that one of these control units performs the function of another control unit. Further, one integrated control unit may perform the functions of all other control units. In other words, the function of one control unit can be performed by another control unit, that control unit need not be installed. This statement is applicable to all embodiments shown in the present application.

Figure 2:
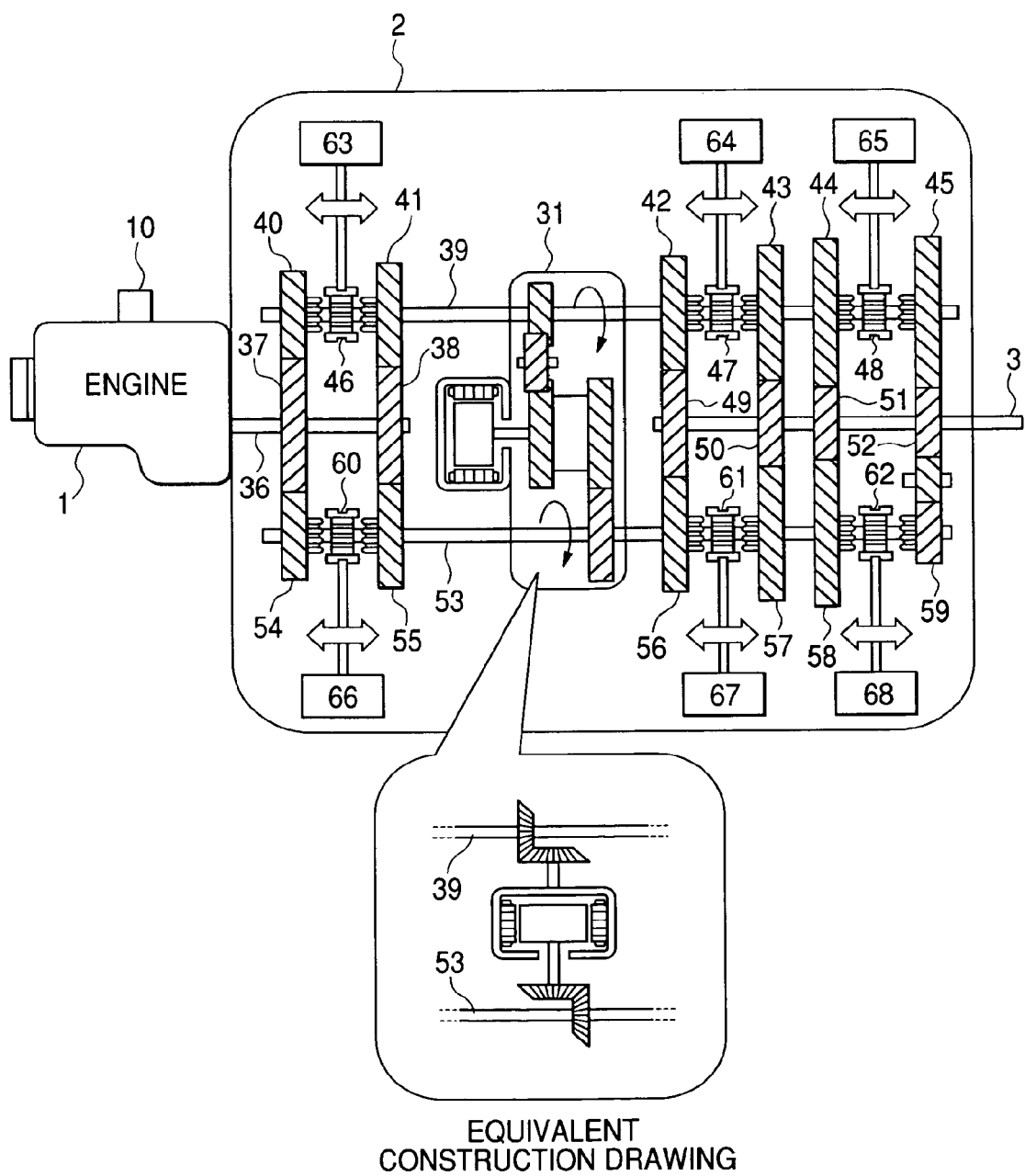
FIG. 2 is a structural diagram representing a transmission as a first embodiment of the present invention.

FIG. 2 is a block diagram of a transmission 2 representing the first embodiment of the present invention. The output of the engine 1 is connected with a transmission input shaft 36. The transmission input shaft 36 is fixed with input gears 37 and 38. A first intermediate shaft 39 is arranged opposite to the input shaft 36, and transmission gears 40, 41, 42, 43, 44 and 45 are mounted rotatably on the first intermediate shaft 39. These transmission gears are equipped with dog clutches 46, 47 and 48 so that any one of the transmission gears can be engaged with the first intermediate shaft 39.

The transmission gears 40 and 41 of the first intermediate shaft 39 are meshed with the input gears 37 and 38, and the transmission gears 42, 43, 44 and 45 are meshed with driven gears 49, 50, 51 and 52.

A second intermediate shaft 53 is provided opposite to the input shaft 36, and the second intermediate shaft 53 is rotatably equipped with transmission gears 54, 55, 56, 57, 58 and 59. These transmission gears are provided with clutches 60, 61 and 62 so that any one of the transmission gears can be engaged with the second intermediate shaft 53.

The transmission gears 54 and 55 of the second intermediate shaft 53 are also meshed with the input gears 37 and 38. Further, transmission gears 56, 57, 58 and 59 are meshed with the driven gears 49, 50, 51 and 52 fixed to the output shaft 3, respectively.

The dog clutches 46, 47, 48, 60, 61 and 62 slide to be meshed with the intended gears by means of shift forks, which are driven by shift actuators 63, 64, 65, 66, 67 and 68.

The present embodiment is characterized in that a differential gear box 31 using a planetary gear is connected to the first intermediate shaft 39 and second intermediate shaft 53, and a motor 5 is connected to the third shaft of the differential gear box 31. The revolutionary speed of the motor 5 is equal to the revolutionary speed of the difference of two intermediate shafts. The torque generated by the motor 5 acts in such a manner as to twist the two intermediate shafts in the directions opposite to each other. This is equivalent to the case where the rotor and stator of the motor 5 are connected to the respective input shafts, as shown in the equivalent construction drawing. The following description will be based on this equivalent construction drawing.

FIG. 3 shows an example of the operation mode of the present transmission. The transmission ratio of this transmission is determined by a combination of two transmission gears. The engine torque is transferred from the input shaft 36 to either the first intermediate shaft 39 or second intermediate shaft 53. A drive mode is defined as the mode where the engine torque is transferred from the intermediate shaft directly to the output shaft 3, while an assist mode is defined as the mode where the engine torque is transferred to the output shaft 3 after having been transferred to another intermediate shaft through the motor. The 1st, 2nd, 3rd, 4th and 5th gears are in the drive mode, while 0.5th, 1.5th, 2.5th, 3.5th and 4.5th gears are in the assist mode.

In either mode, engine torque is transmitted through two dog clutches. To perform power-on shift, connection of either one of the dog clutches must be changed, with the remaining one left unchanged. Otherwise, the torque will be suspended, and transmission feeling will be impaired. Further, means must be provided to ensure that the transmission ratio in the assist mode will be the median value of the transmission ratio in the drive mode. The gear ratio of each transmission gear is set by giving consideration to these two restrictions.

Figures 4A, 4B:
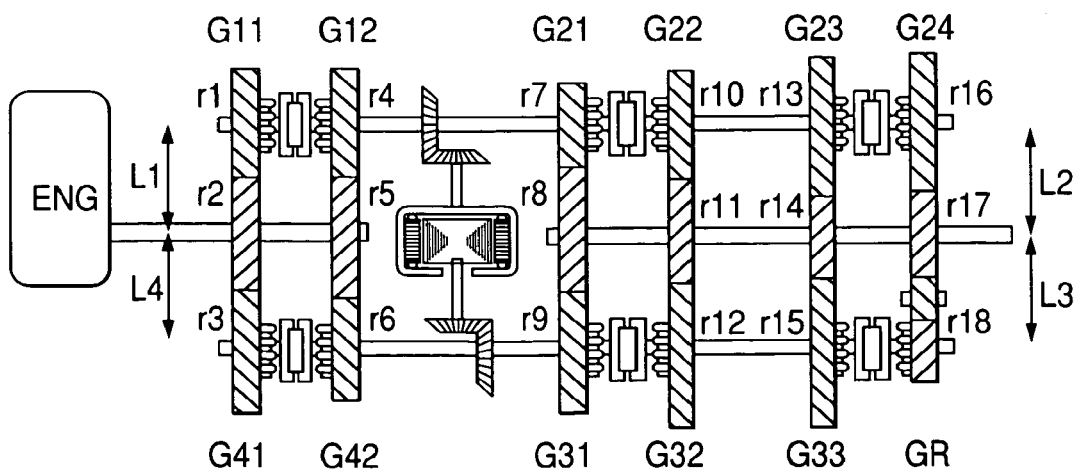
FIG. 4 is a list showing the gear combinations and transmission ratio when sequential transmission is performed, in the transmission shown in FIG. 2.

FIG. 4 shows an example of the transmission ratio gained by the setting gear ratio and its combination thereof. It meets the aforementioned two restrictions and corresponds to FIG. 3. The definition of each gear ratio is given in the figure attached to FIG. 4. The transmission ratio in the assist mode is slightly smaller than the median value of the transmission ratio in the drive mode. This is because the planned value is intentionally misaligned, giving consideration to the motor inverter efficiency. After having aligned the following center distances, the misalignment was at most 2% or so, although it was further increased from the planned value.

FIG. 5 shows the radius r1 through r18 of transmission gears for realizing these gear ratios, and the center distances L1 through L4 determined thereby. The radius and center distance are defined in the figure attached to FIG. 4. As described above, the center distance L1 is equal with respect to transmission gears 40 and 41, and the center distance L4 is equal with respect to transmission gears 54 and 55; therefore, transmission gears 40 and 41 and transmission gears 54 and 55 can be made to mesh each other from both sides of the input gears 37 and 38. Similarly, the center distance L2 is equal with respect to the transmission gears 42 through 45, and the center distance L3 is equal with respect to the transmission gears 56 through 58; therefore, these gears can be made to mesh with each other from both sides of the driven gears 49 through 52. The transmission gear 59 is used for backing up, and an idler is inserted, so there is no need of giving consideration to the center distance L3.

Further, the input shaft 36, first intermediate shaft 39, second intermediate shaft 53 and output shaft 3 are not arranged on a flat plane, so there is no need of meeting L1=L2, and L3=L4.

Incidentally, the transmission in FIG. 2 permits a variety of combinations in addition of the combination given in FIG. 3 (FIG. 4). FIG. 6 shows the combinations other than those given above. A variety of intermediate transmission ratios can be obtained. They are transmission ratios for the engine, and this transmission also changes transmission ratio for the motor. FIG. 7 shows all combinations including the transmission ratio for the motor. The portion enclosed by bold frames indicates transmission ratio with respect to the motor. The other shows the gear ratio with respect to the engine. The crosshatched section shows the mode where the engine torque is transferred through the motor. The bold characters show the combinations of FIG. 3 (FIG. 4). Combinations of the G11 and G12, and G41 and G42 are also possible. Transmission ratio between the engine and motor is shown. This is possible when only one gear on the output shaft side is connected. When the combination shown by the bold frame is used, connection is prohibited. This is indicated by "–". The combination marked with "×" refers to the case of double meshing, and revolution is disabled in this state. As described above, the transmission shown in FIG. 2 is capable of 48 transmissions ratios.

FIG. 8 shows changes in the combination when a 2-step jump-over gear shift is performed in the present transmission. The jump-over gear shift is normally carried out by rapid step-on gas pedal, so downshift is shown. A completely reverse process is taken for jump-over upshift. However, there is hardly any request for upshift. Since this corresponds to what is called "lift foot upshift" where gas pedal is released, there is no problem with torque interruption. All that is needed is jumping over to the mode required in the line of transmission. The same mode as that in the sequential shift of FIG. 1 can be used for 5-3 shift and 4-2 shift. However, if the same mode as shown in FIG. 3 is to be used for 3-1 shift, simultaneous changes of two dog clutches will occur, with the result that torque interruption takes place. To solve this problem, gear shift is performed from 3 to 1.2 through 1.7. This method provides satisfactory gear shift without causing torque interruption.

Figure 9A:
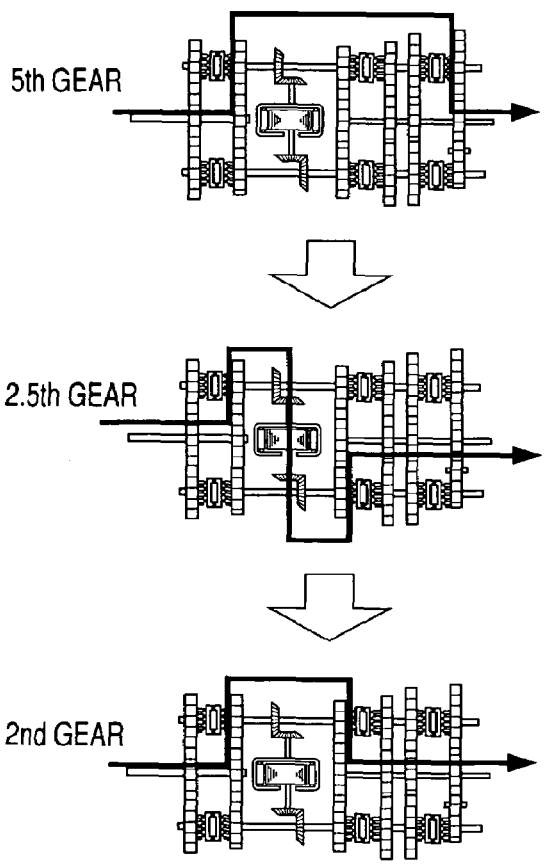
FIG. 9 is an explanatory diagram representing changes of the torque transfer path when 3-step jump-over gear shift is performed in the transmission shown in FIG. 2.
Figure 9B:
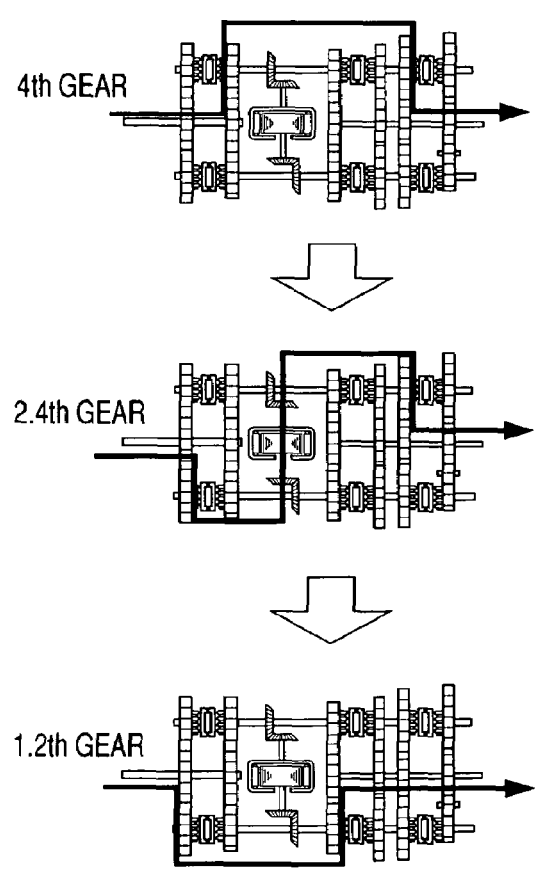

FIG. 9 represents the changes in combinations for 3-step jump-over gear shift in the present transmission. Since the 3-step jump-over gear shift is required for kick-down, the down shift is shown. In this case, 5-2 shift is performed in the same mode as that in the sequential shift of FIG. 3. If the same mode as that of FIG. 3 is to be used for 4-1 shift, torque interruption occurs. If gear shift is performed from 4 to 1.2 through 2.4, satisfactory gear shift can be provided without causing torque interruption.

Figure 10:
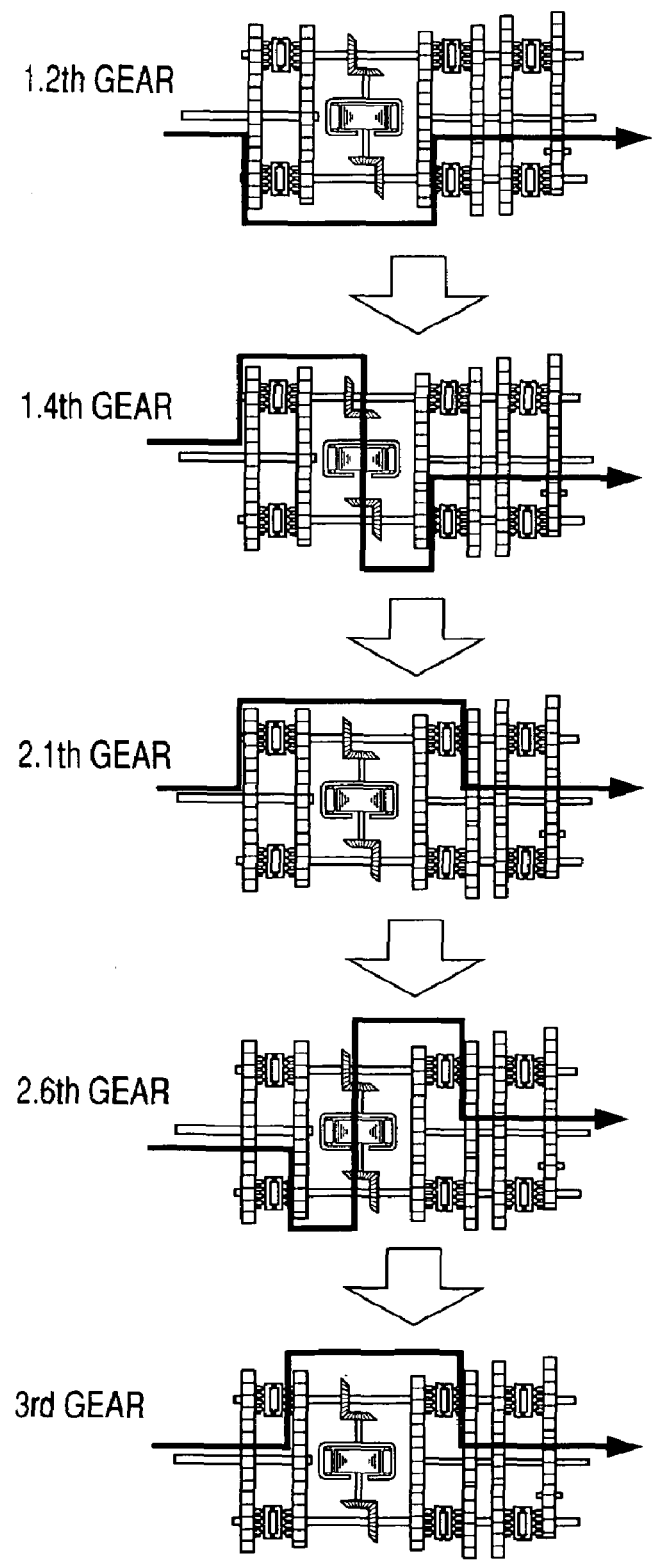
FIG. 10 is an explanatory diagram of gear combinations representing changes of the torque transfer path at the time of power-on upshift performed after jump-over downshift in the transmission shown in FIG. 2.

FIG. 10 shows the upshift after jump-over gear shift. In both 2-step and 3-step jump-over gear shifts, 1.2th gear is obtained by combinations of G41 and G31. After the driving force has been increased by downshift, upshift is carried out by acceleration. In this case, 1.2 is reached through 1.4 by the process shown in FIG. 10. Further, 3rd gear is reached through 2.6. After that, one can go back to the process shown in FIG. 3.

Figure 11:
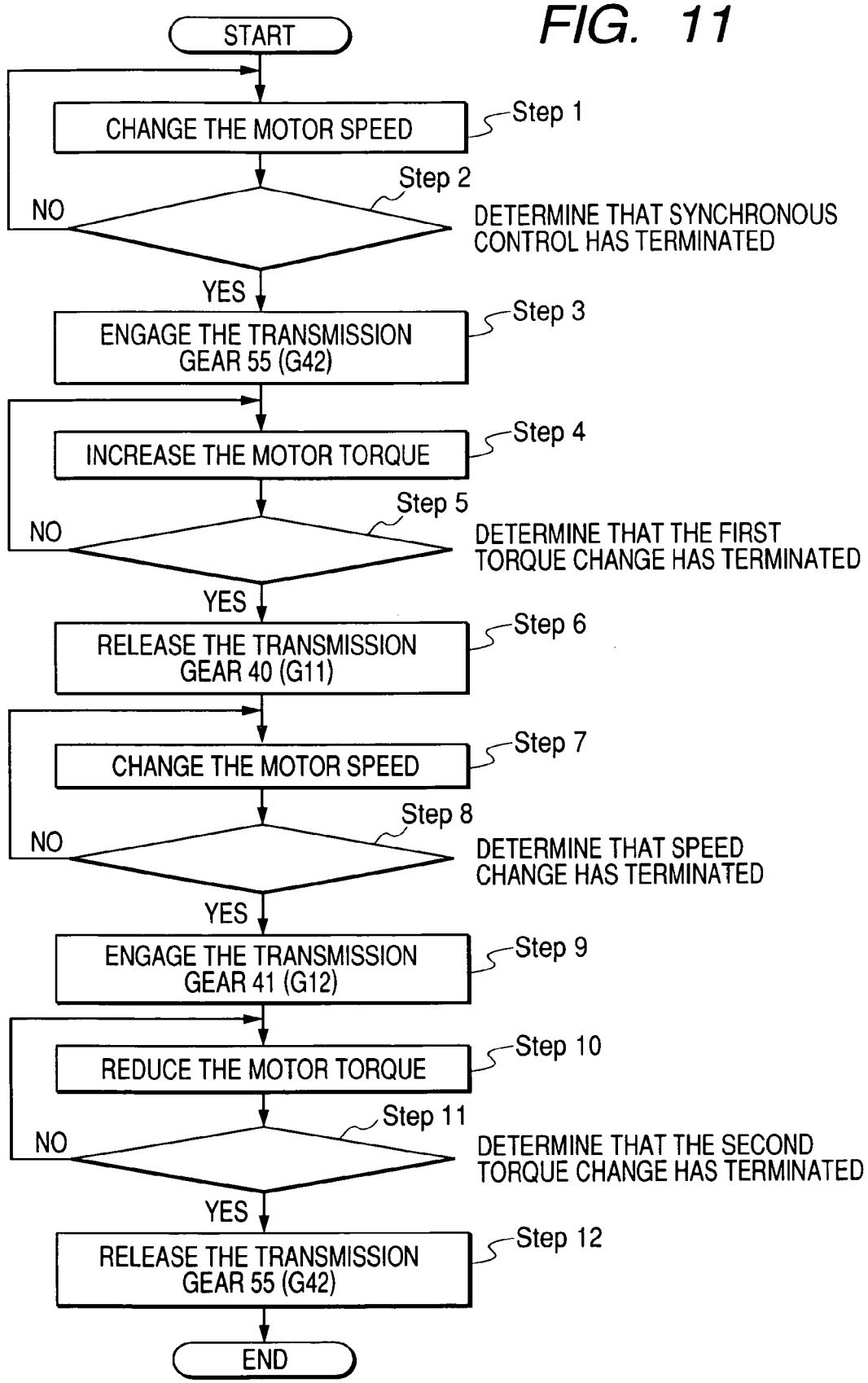
FIG. 11 is a flowchart representing software configuration at the time of 1-2 upshift in the transmission shown in FIG. 2.

FIG. 11 is a flowchart representing an example of power-on upshift from 1 to 2.

Figure 12A:
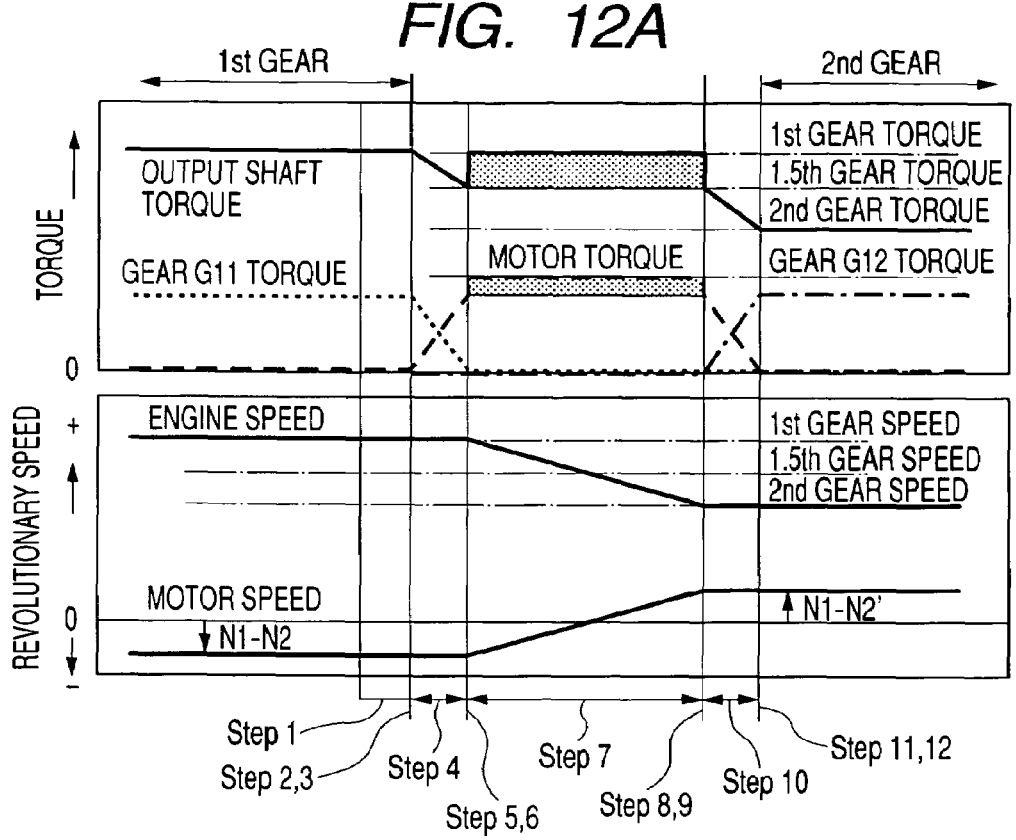
FIG. 12 is a time chart representing a time chart showing the changes in the torque and speed in 1-2 power-on upshift in the transmission shown in FIG. 2, and an explanatory diagram showing the torque transfer path and dog clutch operation.

FIG. 12A is a time chart representing the changes in the torques and speeds of various sections in this case, in the form corresponding to the steps given in FIG. 11.

FIG. 12B again shows the changes in the torque transmission route of upshift from 1 to 2 shown in FIG. 3 and meshing clutch.

Referring to FIGS. 11 and 12, the following describes the operations in the upshift from 1 to 2.

Figure 12B:
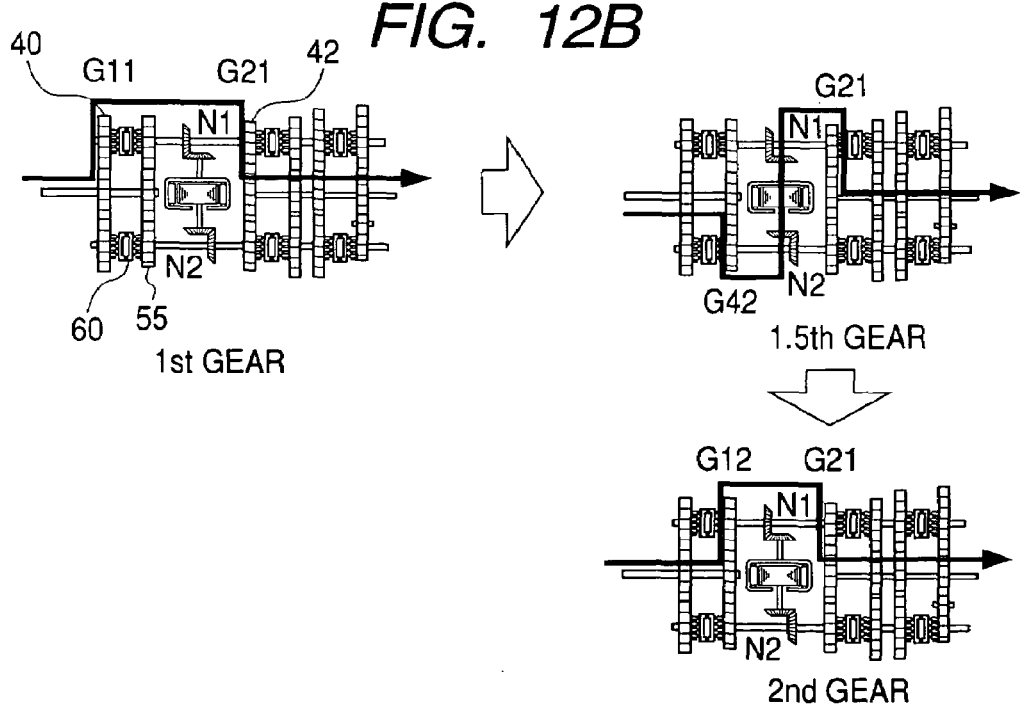

In Step 1, while the car is driving with the transmission gears 40 (G11) and 42 (G21) engaged, the motor speed is controlled to change the revolutionary speed N2 of the second intermediate shaft 53, as shown in FIG. 12B.

In Step 2, evaluation is made to determine that the revolutionary speed N2 of the second intermediate shaft 53 has been synchronized with the revolutionary speed of the transmission gear 55 (G42).

In Step 3, the transmission control unit 8 actuates the shift actuator 66, and moves the dog clutch 60 rightward, as shown in the drawing. When it has been engaged with the transmission gear 55, the motor 5 performs an idle rotation at the speed of (N1−N2). This can be expressed as follows:

$$N1 = G21 \times No \qquad \text{(Equation 1)}$$

$$N2 = Ne/G42 = G11 \times G21/G42 \times No \qquad \text{(Equation 2)}$$

When calculation is made by applying numerals in FIG. 4, (N1−N2)=−0.277×No. This is a negative value. Here the G11 denotes the gear ratio of the transmission gear 40, the G21 the gear ratio of the transmission gear 42, the G42 the gear ratio of the transmission gear 55, Ne the revolutionary speed of the engine 1, and N1 the revolutionary speed of the first intermediate shaft 39.

In Step 4, if motor torque is increased in the negative direction (a driving force for the output shaft, and a load for the engine), the input torque of the transmission gear 55 (G42) will be increased, and the input torque of the transmission gear 40 (G11) will be reduced, as shown in the timing chart of FIG. 12. This is a process of torque transfer 1 of what is called torque phase.

In Step 5, the transmission control unit 8 determines if the torque transfer 1 has terminated or not. It is intended to determine if the input torque of the transmission gear 40 (G11) has been reduced to zero or not. However, since it often happens that the input torque of the gear cannot be directly detected, the input torque of the gear can be considered as "0", when the value of the motor transfer torque expressed in terms of the engine shaft has reached the value equal to the absolute value of the engine torque. For this purpose, it is necessary to get the engine torque Te in advance by detection or calculation. Its specific method is shown in the Japanese Patent Laid-Open No. Hei 05-240073 and Japanese Patent Laid-Open No. Hei 06-317242, and will not be described here.

In Step 6, the transmission control unit 8 operates the shift actuator 63, as shown in FIG. 12B, and releases the transmission gear 40 (G11). Easy release is possible from the state of torque being zero. There is no change to the operation of the transmission. When the transmission gear 40 (G11) has been released, the engine speed can be changed.

In Step 7, when the transmission control unit 8 issues a motor speed change command, the engine speed is changed toward the revolutionary speed of second gear. This is a speed change process called inertia phase.

In the case of 1-2 upshift, the revolutionary speed of the transmission gear 41 (G12) will be reduced to N1, if the motor speed is changed to reach (N1−N2'), with the motor torque kept constant, as shown by the speed change in the time chart of FIG. 12A. In this case:

$$N2'=Ne/G42=G12\times G21/G42\times No \quad \text{(Equation 3)}$$

The G12 indicates the gear ratio of the transmission gear 41.

The (N1−N2) obtained from Equation 1 and Equation 2 was a negative value, but the (N1−N2') obtained from Equation 1 and Equation 3 was 0.181×No, a negative value. The direction of motor rotation was changed halfway through the rotation so that the speed of the transmission gear 41 (G12) was changed to N1.

In Step 8, the transmission control unit 8 determines if the speed change has terminated or not. This determination is made by checking if the speed of the input shaft 36, i.e. the engine speed Ne has been synchronized with the (N1×G12) or not.

In Step 9, the transmission control unit 8 operates the shift actuator 63 so that the dog clutch 46 of the transmission gear 41 (G12) will be engaged. Since it is in the synchronized state, it can be easily engaged, without giving any change to the operation of the transmission.

In Step 10, the transmission control unit 8 issues the motor torque reduction command. When the motor torque is reduced to "0" as shown by the speed change in the time chart 2 of FIG. 12A, the engine torque transferred to the transmission gear 55 (G42) through the motor 5 moves to the transmission gear 41 (G12), as shown in FIG. 12B.

In Step 11, the transmission control unit 8 determines that the torque change 2 has terminated, since the motor torque has been reduced to "0".

In Step 12, the transmission control unit 8 operates the shift actuator 66 and releases the transmission gear 55 (G42), thereby terminating the gear shift. Since the motor torque is in the state of "0", easy release can be achieved, without giving any change to the operation of the transmission.

The description refers to the case of 1-2 upshift. The upshift up to 5th gear and downshift as well as jump-over gear shift can be performed in identically the same manner.

Figure 13:
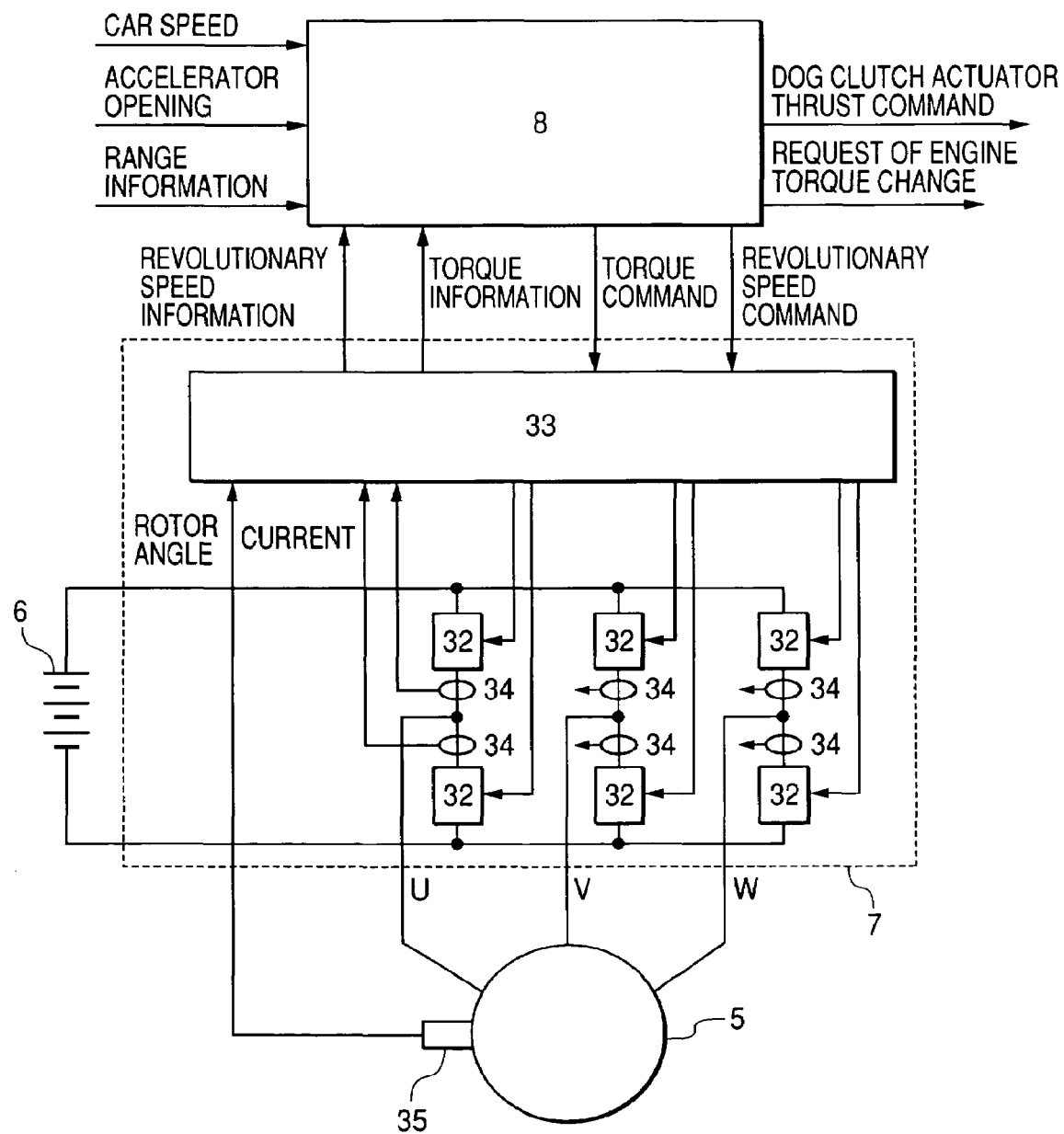
FIG. 13 is a block diagram showing the configuration of the motor control used in the present invention.

FIG. 13 shows the motor control system. The motor 5 is a permanent magnetic synchronous motor, for example. Three-phase alternating current U, V and W are supplied by motor control equipment 7. Each arm of the inverter of the motor control equipment 7 is provided with a high speed switching device 32 so that the d.c. voltage of a battery 6 is converted into 3-phase voltage of variable frequency. In response to the torque instruction and speed reference command from the transmission control unit 8, the inverter control unit 33 controls the duty of the inverter, and feeds back the output of the current sensor 34 of each arm and the output of the angle detecting position sensor 35 of the rotor so that the torque and speed of the motor 5 will conform to the commands. Such control is a known art in the field of power electronics, and will not be described.

Figure 14:
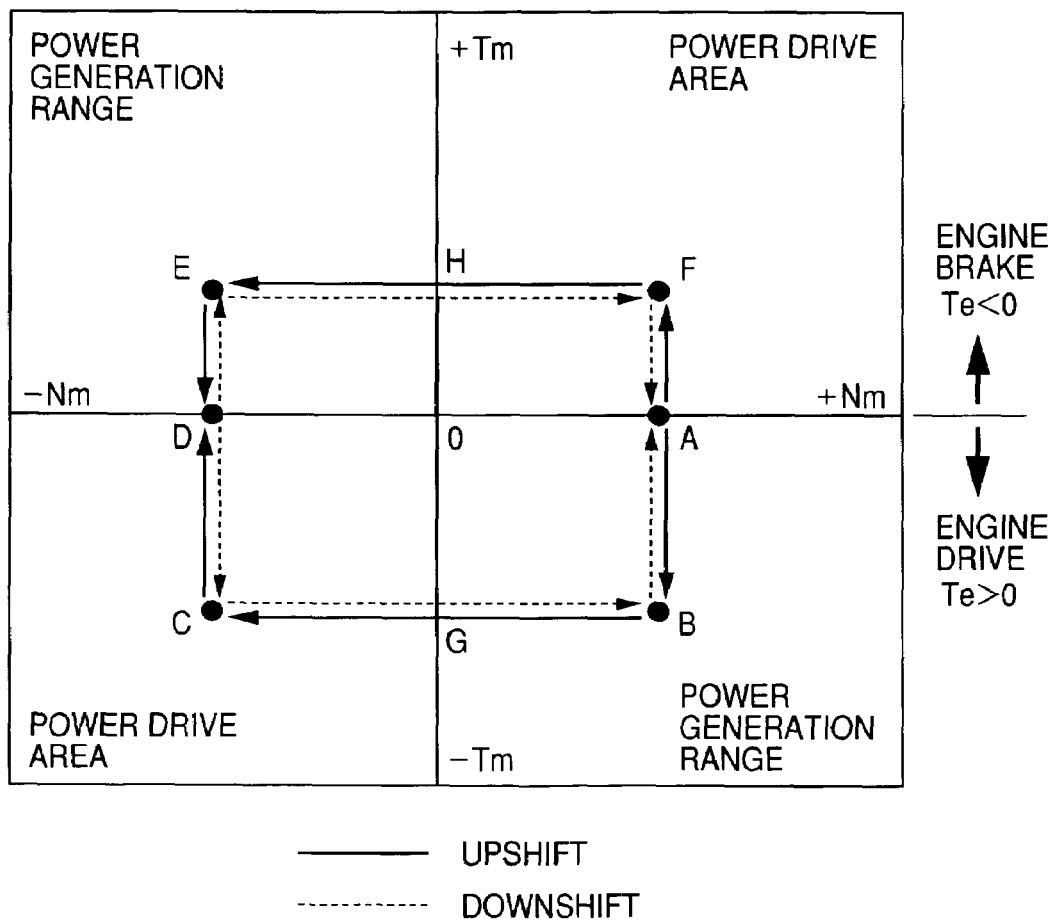
FIG. 14 is a motor characteristic drawing representing the changes in motor operating points in the motor control of FIG. 9.

FIG. 14 shows the relationship between motor torque and speed. What is called "4-quadrant control" is provided by the motor control equipment 7.

The following description assumes that the direction of the motor torque for assisting engine torque is positive.

In the case of so-called power-on upshift where upshift is carried out during acceleration by the engine torque, if the motor torque is generated by torque phase, the operating point moves from point A to point B. It is further moved to point C by inertia phase, and to point D at the termination of the gear change.

In the case of the power-on downshift, the procedure is reversed. Starting from point D of FIG. 14, the operating point is moved to point C by the torque phase, and to point B by the inertia phase. Gear shift terminates at point A.

In the case of lift foot upshift and coast-down, the area is the so-called engine braking area where the engine absorbs driving force, so the operating point moves to the first and second quadrants in FIG. 14.

The type of the motor is not restricted to the permanent magnetic synchronous motor so long as 4-quadrant control can be provided. It goes without saying that an induction motor or d.c. motor can be used.

Figure 15:
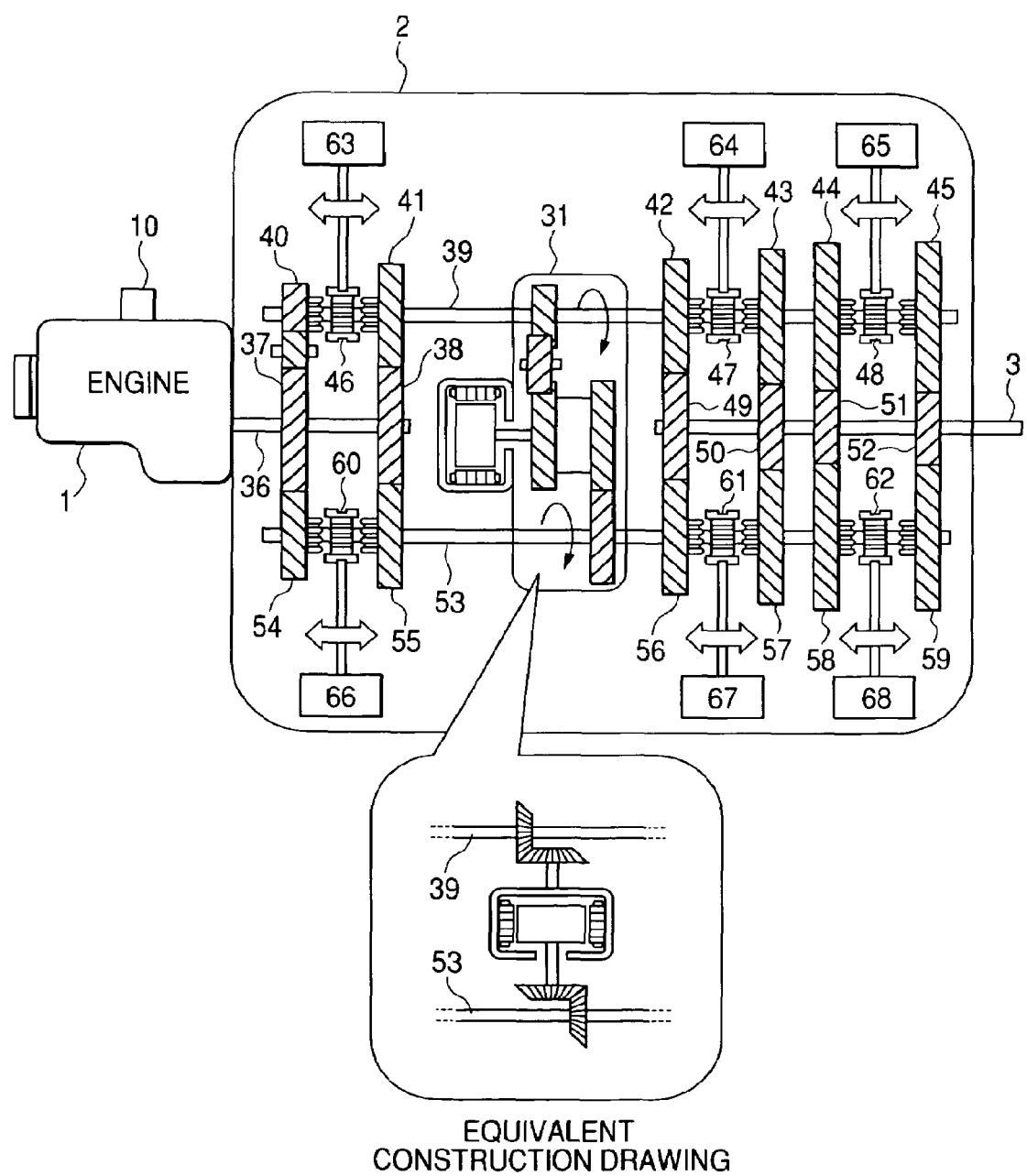
FIG. 15 is a structure diagram representing the configuration of a transmission as a second embodiment of the present invention.

FIG. 15 is a block diagram representing the transmission 2 as a second embodiment of the present invention. What is different from FIG. 2 is that the transmission gear 40 of the first intermediate shaft 39 is used for backing up. Instead, gear ratio of the transmission gear 59 second intermediate shaft 53 is reduced to be used for sixth gear.

FIG. 16 shows an example of the operation mode of this transmission. In the present embodiment, the gear ratio is determined by a combination of two transmission gears. The engine torque is transferred from the input shaft 36 to either the first intermediate shaft 39 or second intermediate shaft 53, and is transferred from that intermediate shaft directly the output shaft 3. This mode is the drive mode, on the one hand. On the other hand, the assist mode is the mode where the engine torque is transferred to the output shaft 3 after having been transferred to another intermediate shaft through the motor. This is the same as the case in FIG. 3. The 1st, 2nd, 3rd, 4th, 5th and 6th gears are in the drive mode, while 0.5th, 1.5th, 2.5th, 3.5th, 4.5th and 5.5th gears are in the assist mode.

In either mode, engine torque is transmitted through two dog clutches. To perform power-on shift, connection of either one of the dog clutches must be changed, with the remaining one left unchanged, in order to prevent the torque from being suspended. Further, means must be provided to ensure that the transmission ratio in the assist mode will be the median value of the transmission ratio in the drive mode. For 3.5th gear and thereafter, the gear ratio of each transmission gear is set by giving consideration to these two restrictions.

Figures 17A, 17B:
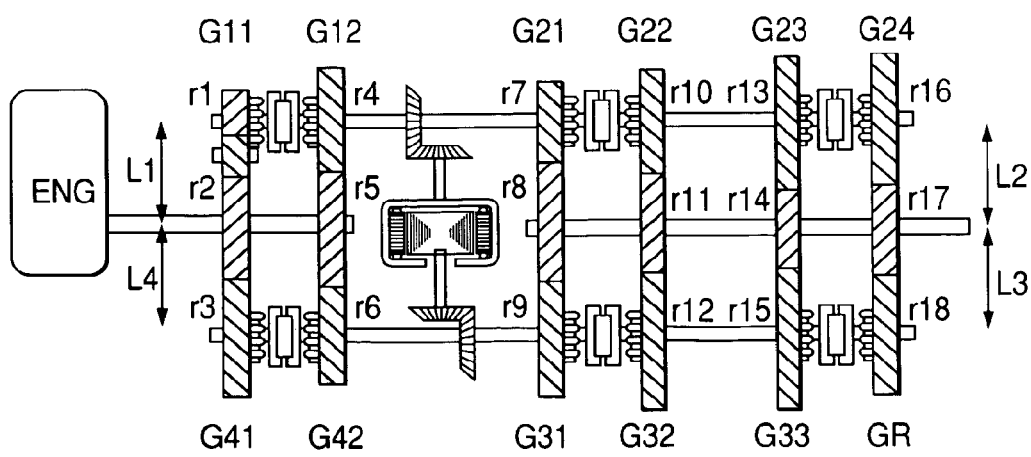
FIG. 17 is a list showing the gear combinations and transmission ratios in the case of sequential transmission in the power-on mode, in the transmission of FIG. 15.

FIG. 17 shows an example of the transmission ratio obtained from the set gear ratio and the combination thereof. It meets the aforementioned two restrictions and corresponds to FIG. 16. The definition of each gear ratio is shown in FIG. 17B. The transmission ratio in the assist mode is slightly smaller than the median value of the transmission ratio in the drive mode. This is because the planned value is intentionally misaligned, giving consideration to the motor inverter efficiency. After having aligned the following center distances, the misalignment was at most 10% or so, although it was further increased from the planned value.

FIG. 18 shows radiuses r1 through r18 of transmission gears for achieving these gear ratios and center distances L1 through L4 determined thereby. The radius and center distances are defined in the drawing attached to FIG. 17B. Since the transmission gear 40 has an idler, the center distance L1 can be determined by giving consideration only to the transmission gear 41. Since center distance L4 is equal with respect to the transmission gears 54 and 55, transmission gears 40 and 41 and transmission gears 54 and 55 can be made to mesh each other from both sides of the input gears 37 and 38. Similarly, the center distance L2 is equal with respect to the transmission gears 42 through 45, and the center distance L3 is equal with respect to the transmission gears 56 through 58; therefore, these gears can be made to mesh with each other from both sides of the driven gears 49 through 52.

Further, the input shaft 36, first intermediate shaft 39, second intermediate shaft 53 and output shaft 3 are not arranged on a flat plane, so there is no need of meeting L1=L2, and L3=L4. However, in the present embodiment, gear ratios G12 and G42 are equal to each other; thus, L1=L4.

The transmission shown in FIG. 15 permits a variety of gear combinations in addition of the combination given in FIG. 17. FIG. 19 shows the combinations other than those given above. A variety of intermediate transmission ratios can be obtained. They are transmission ratios for the engine, and this transmission also changes transmission ratio for the motor. FIG. 20 shows all combinations including the transmission ratios for the motor. The portion enclosed by bold frames indicates transmission ratio with respect to the motor. The other shows the gear ratio with respect to the engine. The crosshatched section shows the mode where the engine torque is transferred through the motor. The bold characters show the combinations of FIG. 17. Combinations of the G11 and G12, and G41 and G42 are also possible. Transmission ratio between the engine and motor is shown. This is possible when only one gear on the output shaft side is connected. When the combination shown by the bold frame is used, connection is prohibited. This is indicated by "–". The combination marked with "×" refers to the case of double meshing, and revolution is disabled in this state. As described above, the transmission shown in FIG. 15 is capable of 48 transmissions ratios.

In the present embodiment, jump-over shift is also possible. It is apparent from FIG. 16 that 6-4 shift is performed through 4.5th gear, 5-3 and 4-2 shift through 3.5th gear, and 3-1 shift through 2.5th or 1.5th gear.

The 3-step jump-over shift is also performed in a similar manner. It is apparent from FIG. 16 that 6-3 shift is performed through 5.5th gear, and 5-2 and 4-1 shift through 3.5th gear.

Except for rapid step-on gas pedal, jump-over gear shift is a gear shift without torque applied. The gear may be shifted directly to the desired step.

The present embodiment provides the advantage that the gear shift step can be expanded up to sixth gear and, at the same time, jump-over gear shift can be easily controlled without using the irregular secondary gear shift step.

The control flow and motor control are the same as those of the first embodiment. The description in FIGS. 11 through 14 is directly applicable.

The present embodiment allows the engine and transmission to be disconnected, without increasing the number of dog clutches. This increases the efficiency of regenerative braking and provides a substantial economical advantage. It also allows the transmission ratio of 1st through 5th gear to be designed in the same manner as before. Further, a large number of secondary transmission ratios can be obtained. Moreover, this is used to perform jump-over gear shift. The motor speed can be changed independently of the engine. This increases the motor efficiency and provides a substantial economical advantage.

What is claimed is:

1. A transmission comprising:
    an input shaft connected to an engine;
    two input gear trains arranged on said input shaft;
    a first intermediate shaft;
    two first transmission gear trains having different rotational directions, connected with or disconnected from said first intermediate shaft with a first dog clutch, meshing with said input gear trains, respectively;
    a second intermediate shaft;
    two second transmission gear trains having gear ratios different from each other, connected with or disconnected from said second intermediate shaft with a second dog clutch, meshing with said two input gear trains, respectively;
    a third transmission gear train arranged on said first intermediate shaft and connected with or disconnected from said first intermediate shaft;
    a fourth transmission gear train arranged on said second intermediate shaft and connected with or disconnected from said second intermediate shaft;
    a driven gear train meshing with said third and fourth transmission gear trains
    an output shaft commonly connected to said driven gear train;
    a differential gear box connected with said first and second intermediate shafts; and
    a motor operatively connected to said differential gear box to apply torque relatively to said first and second intermediate shafts.

2. The transmission according to claim 1, wherein an assist mode transmission ratio is less than a median value of a drive mode transmission ratio.

3. A control unit of a transmission comprising:
    an input shaft connected to an engine;
    two input gear trains arranged on said input shaft;
    a first intermediate shaft;
    two first transmission gear trains having different rotational directions, connected with or disconnected from said first intermediate shaft with a first dog clutch, meshing with said two input gear trains;
    a second intermediate shaft;
    two second transmission gear trains having gear ratios different from each other, connected with or disconnected from said second intermediate shaft with a second dog clutch, meshing with said two input gear trains, respectively;
    a third transmission gear train arranged on said first intermediate shaft and connected with or disconnected from said first intermediate shaft;
    a fourth transmission gear train arranged on said second intermediate shaft and connected with or disconnected from said second intermediate shaft;
    a driven gear train meshing with said third and fourth transmission gear trains
    an output shaft commonly connected to said driven gear train;
    a differential gear box connected with said first and second intermediate shafts; and
    a motor operatively connected to said differential gear box to apply torque relatively to said first and second intermediate shafts;
    wherein said control unit comprises steps of:
    engaging a first transmission gear of said first transmission gear trains,
    engaging a first transmission gear of said third transmission gear train;
    engaging a first transmission gear of said fourth transmission gear train during a drive operation;
    increasing the torque of said motor; thereby shifting transmitting torque of the first transmission gear of said third transmission gear train to the first transmission gear of said fourth transmission gear train;

disengaging said first transmission gear of said third transmission gear train when the transmitting torque thereof has been reduced close to zero;

gradually approaching a revolution speed of the first intermediate shaft to a second transmission gear of said third transmission gear train, while output shaft torque is maintained by said motor;

connecting the second transmission gear of the third transmission gear train, when the revolution speed of said first intermediate shaft has synchronized with that of the second transmission gear of the third transmission gear train; and reducing the torque generated from said motor to zero, thereby disconnecting the first transmission gear of the fourth-transmission gear train.

4. A control unit of a transmission comprising:

an input shaft connected to an engine;

two input gear trains arranged on said input shaft;

a first intermediate shaft;

two first transmission gear trains having different rotational directions, connected with or disconnected from said first intermediate shaft with a first dog clutch, meshing with said two input gear trains, respectively;

a second intermediate shaft;

two second transmission gear trains having gear ratios different from each other, connected with or disconnected from said second intermediate shaft with a second dog clutch, meshing with said two input gear trains, respectively;

a third transmission gear train arranged on said first intermediate shaft and connected with or disconnected from said first intermediate shaft;

a fourth transmission gear train arranged on said second intermediate shaft and connected with or disconnected from said second intermediate shaft;

a driven gear train meshing with said third and fourth transmission gear trains;

an output shaft commonly connected to said driven gear train;

a differential gear box connected with said first and second intermediate shafts; and a motor operatively connected to said differential gear box to apply torque relatively to said first and second intermediate shafts;

wherein said control unit comprises steps of:

engaging a first transmission gear of said two first transmission gear trains, engaging a first transmission gear of said third transmission gear train;

engaging a first transmission gear of said two second transmission gear trains during a drive operation;

increasing torque of said motor thereby shifting transmitting torque of the first transmission gear of said two first transmission gear trains to the first transmission gear of said two second transmission gear trains;

disengaging said first transmission gear of said first two transmission gear trains when the transmitting torque thereof has been reduced close to zero;

gradually approaching a revolution speed of the first intermediate shaft to a second transmission gear of said two first transmission gear trains, while output shaft torque is maintained by said motor;

connecting the second transmission gear of said two first transmission gear trains, when the revolution speed of said first intermediate shaft has synchronized with that of the second transmission gear of said two first transmission gear train trains;

reducing the torque generated from said motor to zero, thereby disconnecting the first transmission gear of the second transmission gear train, and providing at least one gear step of drive modes between gear steps before and after a gear shift operation.

5. An automobile comprising:

an engine;

an electrical controlled throttle valve arranged on said engine;

an engine control apparatus for controlling said throttle valve;

a transmission further comprising:

an input shaft connected to said engine, two input gear trains arranged on said input shaft, a first intermediate shaft, two first transmission gear trains having different rotational directions, connected with or disconnected from said first intermediate shaft with a first dog clutch, meshing with said two input gear trains, respectively;

a second intermediate shaft;

two second transmission gear trains having gear ratios different from each other, connected with or disconnected from said second intermediate shaft with a second dog clutch, meshing with said two input gear trains, respectively;

a third transmission gear train arranged on said first intermediate shaft and connected with or disconnected from said first intermediate shaft;

a fourth transmission gear train arranged on said second intermediate shaft and connected with or disconnected from said second intermediate shaft;

a driven gear train meshing with said third and fourth transmission gear trains;

an output shaft commonly connected to said driven gear train;

a differential gear box connected with said first and second intermediate shafts; and a motor operatively connected to said differential gear box to apply torque relatively to said first and second intermediate shafts; and a motor control unit for controlling torque and revolution speed of said motor so as to shift engine output to the next position gear whereby the speed is changed, wherein at least one gear step of drive modes between gear steps before and after a gear shift operation is provided.

6. The transmission control unit according to claim 5, wherein an assist mode transmission ratio is less that a median value of a drive mode transmission ratio.

* * * * *